United States Patent Office 3,129,219
Patented Apr. 14, 1964

3,129,219
PREPARATION OF 21-BROMINATED PREGNANES
Robert Joly, Montmorency, Seine-et-Oise, Julien Warnant, Neuilly-sur-Seine, Jean Jolly, Fontenay-sous-Bois, Seine, Armand Guillemette, Noisy-le-Sec, Seine, and Bernard Goffinet, Paris, Seine, France, assignors, by mesne assignments, to Roussel UCLAF, S.A., Paris, France, a corporation of France
No Drawing. Filed Dec. 18, 1961, Ser. No. 160,294
Claims priority, application France Dec. 22, 1960
13 Claims. (Cl. 260—239.5)

The invention relates to a novel process for the preparation of 21-bromo-pregnanes of the formula

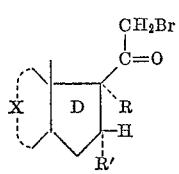
(I)

wherein R' is selected from the group consitsing of hydrogen and methyl and wherein R is selected from the group consisting of hydrogen and hydroxy and X represents the A, B and C rings of a pregnane molecule selected from the group consisting of 5α-pregnane, 5β-pregnane and 4-fluoro-Δ⁴-pregnene. The invention also relates to the novel 21-bromo-steroids.

The present application is a continuation-in-part application of U.S. patent application Serial No. 124,247, filed May 3, 1961, now abandoned.

The bromination steps described in the piror art are not satisfactory. Upon treating pregnane-17-ol-20-ones which do not have a 3-one group in a chlorinated solvent such as chloroform with bromine in the same solvent, a mixture of the starting steroid, the 21-brominated steroid and the 21-dibrominated steroid is obtained. This mixture is difficult to purify and it is necessary to carefully eliminate the 21-dibrominated steroid before forming the 21-acyloxy steroid so as not to contaminate the final product with the 21-diacyloxy steroid.

When brominating pregnane-20-ones which do not possess a 17-hydroxy group such as 5α- or 5β-pregnane-3-ol-20-one and 5α- or 5β-pregnane-3-ol-11,20-dione to form the acetate of desoxy-corticosterone and dehydrocorticosterone, respectively, according to the prior art process, it is necessary to first form the 17-bromo-steroid. The 17-bromo group must be later eliminated and the process, therefore, requires two extra steps.

Moreover, in order to operate the bromination in the desirable homogeneous phase, large volumes of solvent are required and, therefore, large apparatus is needed. Also, the large amount of solvent has to be removed. The French Patent 1,127,897 discloses an attempt to overcome the inconveniences in the bromination of 17-hydroxy-steroids by adding a small amount of ethanol to the non-polar solvent and forming first a complex with hydrochloric acid in the non-polar solvent. However, the yields of pure 21-brominated steroid are not high.

When brominating Δ⁴-pregnene-20-ones having a fluorine group attached to the 4 position, a bromination in the 6 or 2 positions would be expected due to the activation of the 4-fluoro-Δ⁴ group.

It is an object of the invention to provide a process for the preparation of compounds of Formula I in high yields.

It is a further object of the invention to provide a process for the preparation of compounds of Formula I without the prior art disadvantages.

It is another object of the invention to obtain novel 21-brominated pregnane steroids and 21-brominated Δ⁴-pregnene steroids.

These and other objects and advantages of the invention will become obvious from the following detailed description.

The process of the invention comprises reacting a pregnane compound of the formula:

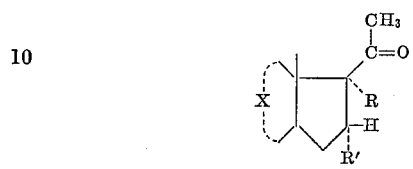

wherein R', R and X have the above definitions with bromine in methanol in the presence of an enolization agent to form the corresponding 21-bromo steroid compounds and recovering the said product. In the case of 17-hydroxylated steroids no 21-dibromo product is formed and in the 17-non-hydroxylated steroids, the 21-bromo product is the predominant product. The reaction scheme is illustrated in Table I.

TABLE I

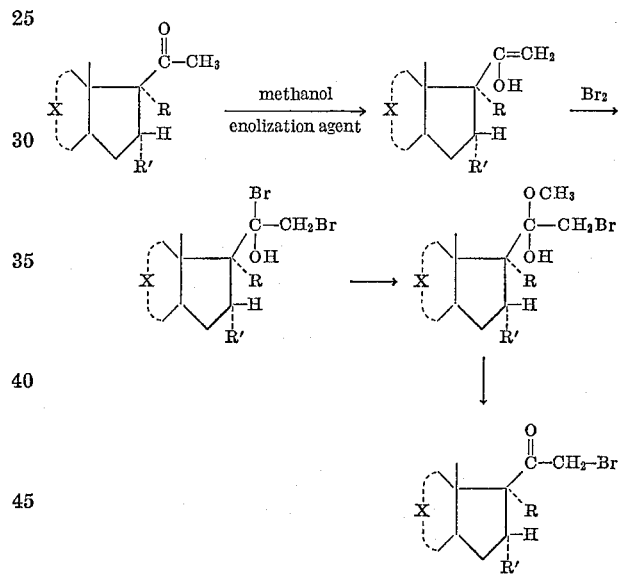

The enolization agent causes the 17β-acetyl group of the pregnane molecule to shift to its enol form which upon bromination forms the corresponding 20-bromo-21-bromo-pregnane or Δ⁴-pregnene-20-ol which immediately reacts with the methanol to form the corresponding 20-methoxy-21-bromo-pregnane or Δ⁴-pregnene-20-ol. The latter compound then forms the desired 21-bromo-20-one steroid compound. The bromination may be carried out at temperatures between about 0° and 50° C., preferably about 30° C. and care should be taken to avoid an excess of bromine. This is best accomplished by stepwise addition of bromine.

The reaction can be conducted in either the homogeneous phase or the heterogeneous phase and the phase will depend upon the solubility of the starting pregnane-20-one or 4-fluoro-Δ⁴-pregnene-20-one. Since the solubility of the starting steroid compound does not affect the reaction, it is possible to always operate in small volumes as large amounts of solvent are not required to dissolve the starting steroid.

The recovery of the 21-bromo-20-one compound after the conclusion of the reaction is a simple matter. Upon pouring the reaction mixture into water, the 21-bromo-20-one compound precipitates and is separated by decantation or filtration. The product can be usually purified by simply washing with water.

Suitable enolization agents are strong acids or acid halides. Examples of enolization agents useful in the process are p-toluene sulfonic acid, gaseous hydrochloric or hydrobromic acids and organic acid chlorides such as acetyl chloride.

The starting compounds of the process have the formula:

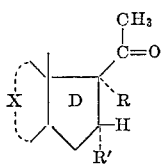

wherein R′, R and X have the above definitions. The A, B, C or D rings may be substituted with hydroxy, keto groups, lower alkoxy, lower alkyl or halogens. Examples of suitable starting materials are 5β-pregnane-3α,17α-diol-20-one, 5β-pregnane-3α,17α-diol-11,20-dione, 5β-pregnane-3α-ol-20-one, 5β-pregnane-3α-ol-11,20-dione, 5α-pregnane-3β,17α-diol-20-one, 4-fluoro-Δ⁴-pregnene-17α-ol-3,11,20-trione, 4-flluoro-16α-methyl-Δ⁴-pregnene-3,11,20-trione, etc. Other pregnane-20-ones and 4-fluoro-Δ⁴-pregnene-20-ones are also suitable.

The 21-bromo compounds of Formula I are valuable intermediates for the preparation of corticosteroids which have a 21-hydroxyl or a 21-acyloxy group having 1 to 18 carbon atoms by the reaction of the 21-bromo compounds with an alkali metal salt of an organic acid in dimethylformamide to form the 21-acyloxy compounds which may be saponified to the 21-hydroxyl compound. The 21-hydroxyl compounds may then be further reacted such as by reduction, etc. to form other steroid compounds.

In the following examples there are described several preferred embodiments to illustrate the invention. However, it is to be understood that the invention is not intended to be limited to the specific embodiments.

*Example I*

PREPARATION OF THE 21-BROMO-5β-PREGNANE-3α,17α-DIOL-20-ONE

To a mechanically agitated suspension of 2 gm. of 5β-pregnane-3α,17α-diol-20-one in 10 cc. of methanol heated to 27° C., there was introduced 0.1 cc. of anhydrous methanol containing 20% of dry hydrochloric acid. Then the bromination was initiated by addition of several drops of bromine. This operation of initiation was repeated a second time after the disappearance of the bromine. Then in a period of 30 to 40 minutes, there was introduced 1 gm. of bromine without letting the temperature of the reaction mixture rise above 26° to 28° C. The steroid was completely dissolved at the end of 20 minutes.

The finish of the bromination was verified by starch iodine paper and the reaction mixture was poured with mechanical agitation into a mixture of water and ice containing 0.2 cc. of a solution of commercial sodium bisulfite in order to destroy the slight excess of bromine. The hydrobromic acid liberated was neutralized to a pH of 7 by the addition of an aqueous solution of sodium bicarbonate. The agitation was continued for some time while maintaining the temperature at about 0° C. The mixture was filtered and the precipitate washed with hot water until there were no halides in the wash water. 2.47 gm. of 21-bromo-5β-pregnane-3α,17α-diol-20-one were obtained, being a yield of 100% of pure product, having a melting point of 219° C., a specific rotation $$[\alpha]_D^{20} = +57° \pm 3°$$

(c.=1% in chloroform), and containing 19.3 to 19.4% of bromine (theoretical: 19.33%).

*Example II*

PREPARATION OF 21-BROMO-5β-PREGNANE-3α,17α-DIOL-11,20-DIONE

With mechanical agitation 4 gm. of 5β-pregnane-3α,17-diol-11,20-dione were introduced into 16 cc. of methanol while elevating the temperature of the suspension to 30° C. 0.2 cc. of absolute methanol containing 20% anhydrous hydrochloric acid was added. The bromination was commenced as in Example I and 1.92 gm. of bromine were added over a period of 40 to 50 minutes while externally cooling so that the temperature of the reaction mixture is not raised above 30° C. The excess of bromine was destroyed by the addition of 1.92 gm. of sodium metabisulfite dissolved in 20 cc. of water.

The reaction mixture was agitated for some time and added to a mixture of ice and water. The product was filtered and washed with a mixture of equal parts of dichlorethane and water, then with water until the wash water was free of halides, filtered and dried. 4.86 to 5 gm. of 21-bromo-5β-pregnane-3α,17α-diol-11,20-dione, 2% hydrated were obtained, being a yield of 97 to 100%. The product had a melting point of 218–219° C. and a specific rotation $[\alpha]_D^{20} = 80° \pm 1°$ (c.=0.5% in chloroform). The product contained 19.1% of bromine (theoretical: 19.3%).

*Example III*

PREPARATION OF 21-BROMO-5β-PREGNANE-3α-OL-20-ONE 10 gm. of 5β-pregnane-3α-ol-20-one were dissolved under mechanical agitation in 70 cc. of pure methanol at a temperature of about 30° C. and 4 drops of acetyl chloride were added. Then 0.3 cc. of a solution of bromine in methanol containing 12.2% of bromine was introduced. The decoloration was total in less than a minute. The bromination was again initiated by 0.3 cc. of the same solution. Then 46.5 cc. of the same methanolic solution of bromine were added after each decoloration at 30° C. for a period of 16 to 18 minutes so that there was never an excess of bromine in the solution. (The solution was not allowed to turn red.) At the end the solution turned yellowish-orange and the speed of absorption was retarded. It was verified with starch iodine paper that an excess of bromine was present.

The solution was rapidly poured into a mixture of water and ice. The 21-brominated derivative crystallized. The solution was maintained 1 hour between 0° and +5° C., vacuum filtered, and the precipitate washed with water and dried. After recrystallization from isopropyl ether, the 21-bromo-5β-pregnane-3α-ol-20-one was obtained in a yield in excess of 60%, having a block melting point of 139–140° C. and a specific rotation $[\alpha]_D^{20} = +125° \pm 1.5°$ (c.=0.5% in chloroform).

*Analysis.*—$C_{21}H_{33}O_2Br$; molecular weight=413.4. Calculated: C, 63.46%; H, 8.37%; Br, 20.11%. Found: C, 63.5%; H, 8.3%; Br, 20.8%.

This compound is not described in the literature.

*Example IV*

PREPARATION OF 21-BROMO-5β-PREGNANE-3α-OL-11,20-DIONE

A solution of 10.6 gm. of 5β-pregnane-3α-ol-11,20-dione in 70 cc. of methanol was prepared as in Example III. After the addition of several drops of acetyl chloride and initiation of bromination as in Example III, 50.5 cc. of a methanolic solution of bromine of the same concentration were introduced stepwise. After precipitation in ice water and drying, 12.5 gm. of 21-bromo-5β-pregnane-3α-ol-11,20-dione were obtained. By acetoxylation of the product with sodium acetate in a dimethylformamide medium, the 21-acetoxy-5β-pregnane-3α-ol-11,20-dione was formed with a yield greater than 60%. This latter compound is an intermediate in the synthesis of corticosterone.

By operating Example IV except that 5α-pregnane-

3β,17α-diol-20-one is used as the starting material, 21-bromo-5α-pregnane-3β,17α-diol-20-one is obtained.

Example V

PREPARATION OF 4-FLUORO-21-BROMO-Δ⁴-PREGNENE 17α-OL-3,11,20-TRIONE

*Step A.*—10 gm. of Δ⁴-pregnene-17α-ol-3,11,20-trione in 70 cc. of methanol were heated to reflux under agitation and an atmosphere of nitrogen. A mixture of 9 cc. of pyrrolidine and 10 cc. of methanol was added and the heating was continued for a period of five minutes. The reaction mixture was cooled to 0° C. and allowed to stand for several minutes at this temperature. Then the 3-(N-pyrrolidyl)-Δ³,⁵-pregnadiene-17α-ol-11,20-dione was vacuum filtered. This product was recrystallized from petroleum ether. The yield was 11.1 gm. (being 96.5%) of a product melting at 238° C. and having a specific rotation $[\alpha]_D^{20} = -143°$ (c.=0.5% in dioxane).

The product occurred in the form of pale yellow crystals, soluble in chloroform, methylene chloride and dioxane, slightly soluble in benzene and insoluble in water, alcohol, ether and acetone.

Amount of nitrogen: 3.6%, theoretical being 3.52%. This product is not described in the literature.

*Step B.*—10 gm. of 3-(N-pyrrolidyl)-Δ³,⁵-pregnadiene-17α-ol-11,20-dione were introduced into 100 cc. of methanol. The solution was cooled to −20° C. and perchloryl fluoride was made to bubble through for a period of 15 minutes. The excess of perchloryl fluoride was removed by a stream of nitrogen. The mixture was added to water and agitated for a period of an hour. The 4-fluoro-Δ⁵-pregnene-17α-ol-3,11,20-trione was vacuum filtered and recrystallized from refluxing acetone.

The product occurred in the form of white crystals having a melting point of 260° C. and a specific rotation $[\alpha]_D^{20} = -21°$ (c.=0.5% in chloroform). It was soluble in chloroform and methylene chloride, slightly soluble in alcohol, ether, acetone, benzene and methanol and insoluble in water.

*Analysis.*—$C_{21}H_{27}O_4F$; molecular weight=362.43. Calculated: C, 69.58%; H, 7.51%; F, 5.24%. Found: C, 69.7%; H, 7.5%; F, 5.49%.

This compound is not described in the literature.

*Step C.*—2 gm. of 4-fluoro-Δ⁵-pregnene-17α-ol-3,11,20-trione were dissolved in 20 cc. of dimethylformamide. 2 cc. of pure hydrochloric acid were added thereto and the reaction mixture was allowed to stand for a period of 15 hours. After the addition of water, the 4-fluoro-Δ⁴-pregnene-17α-ol-3,11,20-trione was vacuum filtered. The product had a melting point of 240° and 290° C. and a specific rotation $[\alpha]_D^{20} = +166°$ (c.=0.5% in chloroform).

The product occurred in the form of white crystals and was soluble in chloroform and methylene chloride, slightly soluble in alcohol, ether, acetone and benzene and insoluble in water and methanol.

This compound is not described in the literature.

*Step D.*—5 gm. of 4-fluoro-Δ⁴-pregnene-17α-ol-3,11,20-trione were introduced into 75 cc. of methanol. 0.5 cc. of acetyl chloride was added and the mixture was heated under agitation to 37° C. 7 cc. of a solution of 14.2% bromine in methanol were added and the heating was continued for a period of a half hour. The reaction mixture was poured into a mixture of water and ice and agitated for an hour at 0° C. The 4-fluoro-21-bromo-Δ⁴-pregnene-17α-ol-3,11,20-trione was vacuum filtered. The yield was 5.78 gm. (being 95% of the theoretical).

This compound is not described in the literature.

The structure of this compound was confirmed by transformation of the product into the 21-acetoxylated derivative. By the action of sodium acetate in a dimethylformamide medium, a product melting at 256° C. and having a specific rotation of $[\alpha]_D^{20} = +213°$ (c.=0.5% in chloroform) was obtained which is the acetate of 4-fluorocortisone.

*Analysis.*—$C_{23}H_{29}O_5F$; molecular weight=420.45. Calculated: C, 65.69%; H, 6.95%; F, 4.52%. Found: C, 65.5%; H, 6.8%; F, 4.2%.

Ultraviolet spectra in ethanol $\lambda_{max}$ 246 mμ.

$E_{1\,cm}^{1\%}$. 339

This compound is not described in the literature.

The free alcohol, 4-fluoro-cortisone, may be obtained by saponification with sodium bicarbonate in a methanolic medium.

The acetate of 4-fluoro-cortisone can be converted to 4-fluoro-cortisol by forming the 3,20-disemicarbazone, reducing the latter with potassium borohydride and hydrolyzing the latter to 4-fluoro-cortisol.

Example VI

PREPARATION OF 4-FLUORO-21-BROMO-16α-METHYL-Δ⁴-PREGNENE-3,11,20-TRIONE 1.99 gm. of 4-fluoro-16α-methyl-Δ⁴-pregnene-3,11,20-trione (obtained according to United States patent application Serial No. 94,980, filed March 13, 1961) were introduced into 20 cc. of methanol containing several drops of acetyl chloride. Then over a period of fifteen minutes, 1.10 gm. of bromine in a solution of 11 cc. of methanol were added. The complete absorption of the bromine was verified with starch iodine paper and the mixture was poured into a mixture of water and ice. After addition of ordinary ether and isopropyl ether, the 4-fluoro-21-bromo-16α-methyl-Δ⁴-pregnene-3,11,20-trione crystallized. The product was vacuum filtered, dried under vacuum and 1.55 gm. of product were obtained (being 64% of the theoretical). The product melted at 173° C.

This compound was not described in the literature.

The product obtained furnished after acetoxylation with sodium acetate in a dimethylformamide medium 4-fluoro-21 - acetoxy - 16α - methyl - Δ⁴ - pregnene - 3,11,20-trione, having a melting point of 215° C. and a specific rotation $[\alpha]_D^{20} = +205°$ (c.=1% in chloroform).

Ultraviolet spectra=$\lambda_{max}$ 246 mμ, ε=14,250.

*Analysis.*—$C_{24}H_{31}O_5F$; molecular weight=418.5. Calculated: C, 68.87%; H, 7.46%; F, 4.54%. Found: C, 68.7%; H, 7.2%; F, 4.7%.

This product can be transformed by saponification with sodium bicarbonate in a methanolic medium into 4-fluoro-16α - methyl - Δ⁴ - pregnene - 21 - ol - 3,11,20 - trione having a melting point of 205° C. and a specific rotation $[\alpha]_D^{20} = +207°$ (c.=1% in chloroform).

*Analysis.*—$C_{22}H_{29}O_4F$; molecular weight=376.5. Calculated: C, 70.19%; H, 7.76%; F, 5.05%. Found: C, 70.1%; H, 7.6%; F, 5.0%.

This compound as well as the acetate above mentioned is not described in the literature.

4 - fluoro - 16α - methyl - Δ⁴ - pregnene - 21 - ol-3,11,20-trione can be converted to the corresponding 11β-hydroxylated compound by formation of the disemicarbazone, reduction of acid hydrolysis in the same manner as the acetate of 4-fluoro-cortisone was changed to 4-fluoro-cortisol.

Various modifications of the process of the invention may be made without departing from the spirit or scope thereof, and it is to be understood that the invention is to be limited only as defined in the appended claims.

We claim:

1. A process for the preparation of a compound having the formula:

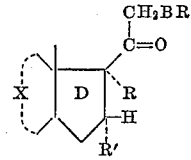

wherein R′ is selected from the group consisting of hydrogen and methyl, and wherein R is selected from the group consisting of hydrogen and hydroxy and X represents the A, B and C rings of a pregnane molecule selected from the group consisting of 5β-pregnanes, 5α-pregnanes and 4-fluoro-Δ⁴-pregnenes which comprises reacting a compound having the formula

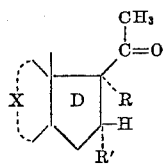

wherein R′, R and X have the above definitions with bromine in methanol in the presence of an enolization agent selected from the group consisting of p-toluene sulfonic acid, mineral acids, organic acid halides and inorganic acid halides to form the 21-bromo-pregnane and recovering the latter.

2. The process of claim 1 wherein the enolization agent is a mineral acid.

3. The process of claim 1 wherein the enolization agent is an organic acid halide.

4. The process of claim 1 wherein the starting compound is 5β-pregnane-3α,17α-diol-21-one and the recovered product is 21-bromo-5β-pregnane-3α,17α-diol-20-one.

5. The process of claim 1 wherein the starting compound is 5β-pregnane-3α,17α-diol-11,20-dione and the recovered product is 21-bromo-5β-pregnane-3α,17α-diol-11,20-dione.

6. The process of claim 1 wherein the starting compound is 5β-pregnane-3α-ol-20-one and the recovered product is 21-bromo-5β-pregnane-3α-ol-20-one.

7. The process of claim 1 wherein the starting compound is 5β-pregnane-3α-ol-11,20-dione and the recovered product is 21-bromo-5β-pregnane-3α-ol-11,20-dione.

8. The process of claim 1 wherein the starting compound is 4-fluoro-Δ⁴-pregnene-17α-ol-3,11,20-trione and the recovered product is 4-fluoro-21-bromo-Δ⁴-pregnene-17α-ol-3,11,20-trione.

9. The process of claim 1 wherein the starting compound is 4-fluoro-16α-methyl-Δ⁴-pregnene-3,11,20-trione and the recovered product is 4-fluoro-16α-methyl-21-bromo-Δ⁴-pregnene-3,11,20-trione.

10. 4 - fluoro - 21 - bromo - Δ⁴ - pregnene - 17α - ol - 3,11,20-trione.

11. 3 - (N - pyrrolidyl) - Δ³,⁵ - pregnadiene - 17α - ol - 11,20-dione.

12. 4 - fluoro - Δ⁵ - pregnene - 17α - ol - 3,11,20-trione.

13. 4 - fluoro - Δ⁴ - pregnene-17α - ol - 3,11,20-trione.

References Cited in the file of this patent

UNITED STATES PATENTS 2,820,763     Laubach     Jan. 21, 1958
2,986,572     Engel     May 30, 1961

OTHER REFERENCES

Cutler et al.: "Journal of Organic Chemistry," vol. 24, November 1959, page 1630 relied on.

Camerino et al.: "Farmaco (Pavia) Ed. Sci.," 13 (1958), pages 52–63 relied on.

Arth et al.: "J.A.C.S.," vol. 80 (1958), page 3160 relied on.